(12) United States Patent
Aguero et al.

(10) Patent No.: US 8,087,100 B2
(45) Date of Patent: Jan. 3, 2012

(54) HELMET MOUNT FOR NIGHT VISION GOGGLES

(75) Inventors: Raymond Aguero, Roanoke, VA (US); Todd Neff, Salem, VA (US); William Eric Garris, Salem, VA (US); Roy Holmes, Salem, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 1057 days.

(21) Appl. No.: 11/944,942

(22) Filed: Nov. 26, 2007

(65) Prior Publication Data

US 2009/0133179 A1 May 28, 2009

(51) Int. Cl.
A42B 3/04 (2006.01)

(52) U.S. Cl. ................................. 2/422; 2/426; 359/409

(58) Field of Classification Search ............... 2/455, 410, 2/422, 426, 453; 359/409
See application file for complete search history.

(56) References Cited

U.S. PATENT DOCUMENTS

| | | | |
|---|---|---|---|
| 3,124,238 A | 3/1964 | Tyler | |
| 4,611,883 A | 9/1986 | Myer | |
| 4,907,296 A | 3/1990 | Blecha | |
| 4,953,963 A * | 9/1990 | Miller | 359/409 |
| 5,176,342 A | 1/1993 | Schmidt et al. | |
| 5,367,402 A | 11/1994 | Holmes et al. | |
| 5,467,479 A * | 11/1995 | Mattes | 2/6.3 |
| 5,471,678 A * | 12/1995 | Dor | 2/6.7 |
| 5,506,730 A | 4/1996 | Morley et al. | |
| 5,542,627 A | 8/1996 | Crenshaw et al. | |
| 5,914,816 A | 6/1999 | Soto et al. | |
| 6,081,094 A * | 6/2000 | Crenshaw et al. | 320/114 |
| 6,457,179 B1 | 10/2002 | Prendergast | |
| 6,472,776 B1 * | 10/2002 | Soto et al. | 307/400 |
| 6,662,370 B1 * | 12/2003 | Buchanan, Jr. | 2/6.2 |
| 6,751,810 B1 | 6/2004 | Prendergast | |
| 6,862,748 B2 | 3/2005 | Prendergast | |
| 6,938,276 B1 | 9/2005 | Prendergast | |
| 6,957,449 B2 | 10/2005 | Prendergast | |
| 7,722,279 B2 * | 5/2010 | Neff et al. | 403/13 |
| 2005/0013658 A1 | 1/2005 | Muders | |
| 2005/0111097 A1 * | 5/2005 | Iannarelli et al. | 359/409 |

OTHER PUBLICATIONS

Official Action dated Jul. 3, 2011, issued in related Israel Patent Application No. 191612.
European Search Report mailed Jul. 25, 2011, in related European Patent Application No. EP 08169579.3.
European Search Report mailed on Mar. 3, 2011, in related European Patent Application No. EP 08169579.3.

* cited by examiner

Primary Examiner — Christopher Harmon
(74) Attorney, Agent, or Firm — RatnerPrestia

(57) ABSTRACT

A helmet mount for night vision apparatus wherein night vision goggles can be coupled and uncoupled to its power pack without the use of tools and wherein the power pack can be coupled and uncoupled to a helmet without the use of tools. When an aviator wearing a helmet with night vision apparatus so mounted, is ejected from his aircraft both the goggles and the power pack are released from the helmet.

13 Claims, 2 Drawing Sheets

HELMET MOUNT FOR NIGHT VISION GOGGLES

STATEMENT REGARDING FEDERALLY SPONSORED RESEARCH

This invention was made under U.S. Government Contract No. PAN/05/0201/06 and the United States Government may have certain rights in this invention.

FIELD OF THE INVENTION

This invention relates to an arrangement for coupling night vision goggle apparatus to a helmet, and more particularly, to such apparatus that automatically releases the goggle apparatus from an aviators helmet when the aviator is ejected from his aircraft.

BACKGROUND OF THE INVENTION

Night vision apparatus is commonly used by aviators to enhance their visibility while flying during night or other low light conditions. Conventional night vision apparatus comprises a night vision goggle including image intensifier tubes, lens assemblies and a complex mounting assembly that provides for numerous adjustments of the goggle position with respect to the user. All of these items combine to provide a relatively heavy device. Such apparatus also includes a relatively light weight power pack that houses a battery or batteries and a circuit board. The power pack is mechanically and electrically coupled to the goggle for operating the goggle and the power pack is, in turn, fixed to the aviators' helmet. As a consequence, the entire weight of the night vision apparatus is supported by the aviator's neck.

When a pilot ejects from an aircraft, the cockpit canopy is ejected from the aircraft and then the aviator is ejected. The acceleration of the aircraft, wind entering the cockpit, the inclination of the aircraft and the large acceleration forces developed as the pilot is suddenly ejected from the aircraft, acting alone or in combination, provide a significant risk that the pilot will be injured.

Because of the heavy weight of the night vision apparatus and because it is supported by the aviator's neck, there is a considerable risk that the apparatus will cause severe neck injuries to the aviator during the ejection.

To reduce this risk of neck injury there are known arrangements that release the night vision goggles from the aviator's helmet as the aviator is subjected to severe acceleration forces during the ejection process. In the known arrangements, however, the relatively light weight power pack does not release. Thus, with the power pack fixed to the helmet, it, the power pack, has the potential to become entangled with the parachute risers during ejection. If the power pack becomes so entangled, it can interfere with the proper opening of the parachute providing additional risk to the aviator.

Accordingly, it is desirable to have a mounting arrangement for night vision apparatus wherein both the goggle and the power pack are automatically released from the aviator's helmet as soon as possible during the ejection process.

SUMMARY OF THE INVENTION

This invention provides a helmet mount for night vision apparatus that automatically releases the apparatus from an aviator's helmet when an ejection is initiated. The night vision apparatus comprises a night vision goggle intensifying low level light into a visible image and a power pack providing electric power operating the goggle. The helmet mount is adapted to be fixed on an aviator's helmet and includes a support band having an inner surface configured to seat on the front surface of a helmet. The support band has a pair of spaced apart ears extending from its outer surface in a generally forward direction. Each ear contains a socket on the surface facing the adjacent surface of the other ear. The power pack includes a spring loaded plunger assembly that cooperates with the sockets on the ears to releasably couple and uncouple the power pack and goggle to and from the support band.

BRIEF DESCRIPTION OF THE DRAWINGS

For a better understanding of the invention, reference is made to the following description of an exemplary embodiment thereof, considered in conjunction with the accompanying drawings, in which.

DETAILED DESCRIPTION OF THE INVENTION

Figure 1:
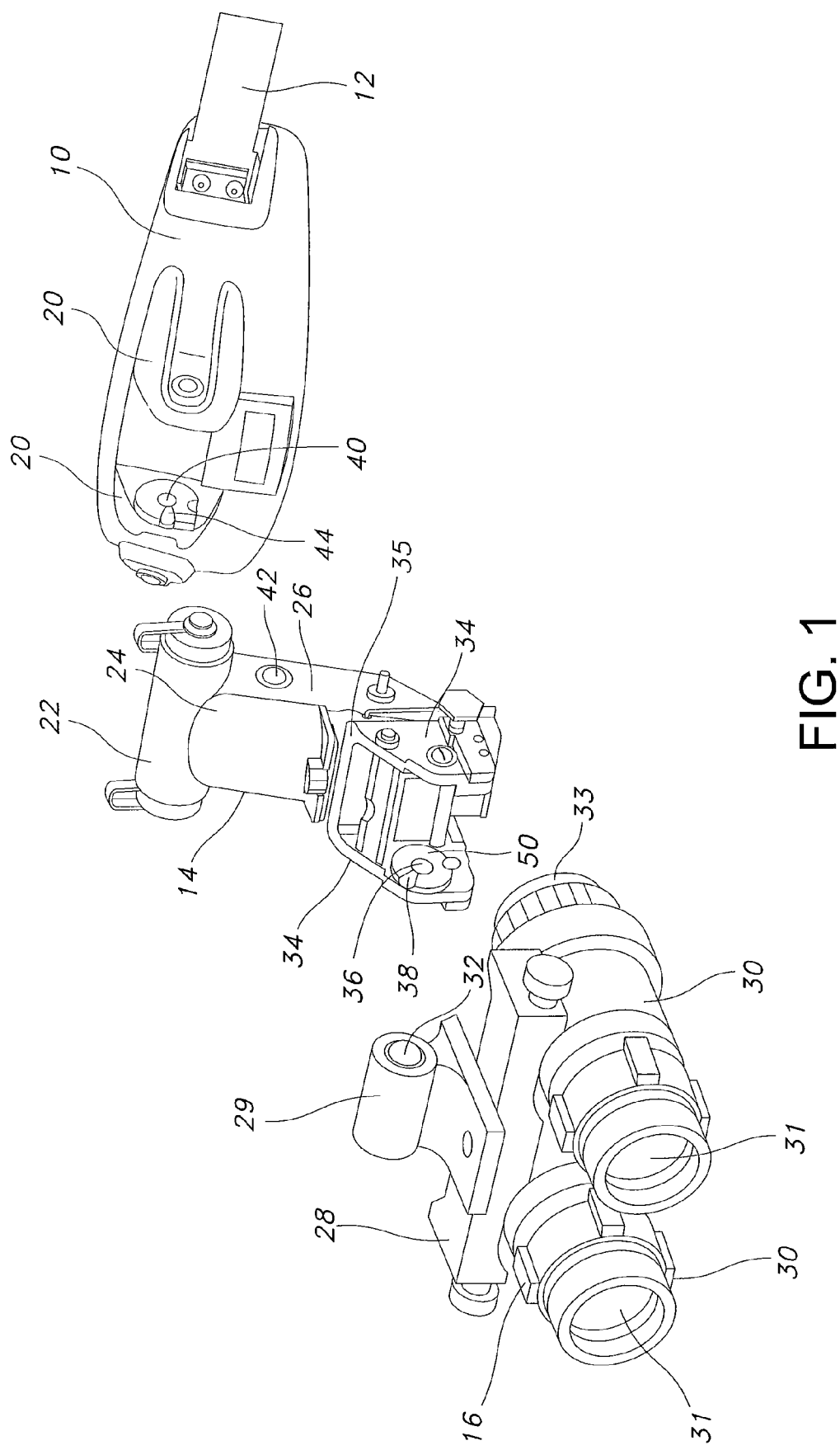
FIG. 1 is an exploded perspective view illustrating a support band and night vision apparatus.

Referring to FIG. 1 there is shown a support band 10 made of plastic or other suitable material. The support band 10 has an inner surface configured to seat on the front surface of a helmet, and one of a pair of mechanical fastener assembly components 12 used to secure the band to an aviator's helmet. Such fastener assemblies are well known in the art. As illustrated in FIG. 1, the component 12 functions as an over the center clamp that cooperates with sockets on the helmet to fix the support band 10 to the aviator's helmet. It is understood that the fastener assembly could be a screw arrangement or a harness arrangement or any other suitable arrangement.

Still referring to FIG. 1, there is also shown a power pack 14 which, as will be made clear hereinafter, is releasably coupled to the support band 10 and a night vision goggle 16 which is releasably coupled to the power pack so that the power pack can be coupled and uncoupled to the support band and the goggle can be coupled and uncoupled to the power pack without the use of tools. The goggle 16 and the power pack 14 are electrically connected so that the power pack operates the goggle. As will also be made clear hereinafter, the releasable couplings between the power pack 14 and the support band 10 and between the power pack and the goggle 16 are configured so that the power pack and the goggles are released simultaneously, preferably as a unit, from the aviator's helmet when a predetermined g-force acts on the aviator.

The power pack 14 includes a battery compartment 22 preferably molded from plastic or other suitable material. The battery compartment 22 is sized and shaped to receive a standard alkaline double AA battery or an L9 lithium battery or other usable battery. Alternatively, the battery compartment may be configured to receive two or more batteries. As is usual, the battery compartment 22 includes battery contacts and electric leads to connect the battery to a printed circuit board which also includes the necessary electric leads and contacts for electrically coupling the printed circuit board to the goggle 16. To accommodate the circuit board, its leads and contacts, the power pack 14 further includes a second compartment also molded from plastic or other suitable material and formed by a front wall 24, a pair of side walls 26 (only one of which is shown) and a back wall (not shown). This second compartment includes a support arrangement to mount the printed circuit board as well as leads and contacts that connect from the battery to the printed circuit board and from the circuit board to the goggle 16.

The night vision goggle 16 can be any such device that receives low level light and intensifies that light to present a viewable image to its user. In the exemplary embodiment shown here, the goggle 16 includes a pair of monoculars 30, 30 of any conventional type. In the alternative a single monocular can be used. Each of the monoculars 30 includes an objective lens 31 that receives low level ambient light and each includes an image intensification tube that intensifies the light and presents a visible images to an eye piece 33 at the end of the monocular opposite the objective lens.

The goggle 16 is carried by adjustable mounting assembly 28, that provides for adjustment of the goggle relative to the aviator. Such assembly may include a flip up mount that allows the goggle 16 to rotate between an operative position in front of the aviators eyes and an inoperative position located adjacent the front of the helmet and above the aviators eyes. As is well known in the art, such adjustable mount assemblies usually include complex adjustment mechanisms for adjusting the goggle's horizontal distance relative to the aviator as well as its tilt and focus, and the interpupillary distance between the monoculars.

The adjustable mount assembly 28 and thus the goggle 16 are coupled to the power pack 14 via a mounting receptacle 35. The receptacle 35 is formed with a pair of spaced apart ears 34, 34 which are generally parallel to the side walls 26, 26 of the second compartment 14. Each ear 34 contains a socket 36 on its inner surface, that is, the surface that faces the adjacent surface of the other ear. In the exemplary embodiment disclosed herein, each socket 36 is in the form of a generally spherical depression, but it could be in the form of a through hole, a bore-counter-bore configuration or a variety of other configurations known in the art.

The adjustable mount assembly 28 includes a housing portion 29 which carries a spring loaded plunger arrangement including a compression spring biasing a pair of plungers 32, 32 (only one of which is shown) outwardly of the end walls of the compartment 29. These plungers 32, 32 can be balls or are otherwise formed with spherical end surfaces that are inserted into the sockets 36, 36 to retain the adjustable mount assembly and binocular 16 on the receptacle 35. The spherical ends of the plunger 32, 32 can also rotate in the sockets 36, 36 to provide for the rotation of the goggle 16 between its operative and inoperative positions.

The sockets 36, 36 can be machined or molded into the adjacent surfaces of the ears 34, 34 or the sockets and their below described grooves 38, 38 can be advantageously formed in inserts 50, 50 carried on the ears. One such insert is disclosed in co-pending application No, 11/944,928 entitled Universal Insert filed concurrently herewith in the name of Raymond Aguero et al. and assigned to the assignee of this application.

The sockets 36, 36 communicate with the outer edge of the ears 34, 34 via tapered grooves 38, 38. The largest arc length of the tapered grooves is open and is located adjacent the outer edge of the ears 34, 34 and the narrowest arc length is located adjacent the sockets 36, 36. The bottom surface of the grooves 38, 38 can be in the form of a ramp that inclines inwardly from the outer edge of the ears 34, 34 to the sockets 36, 36 so that the distance between the grooves decreases as the grooves approach the sockets.

To couple the night vision binoculars to the adjustable mounting assembly, the spring loaded plungers 32, 32 are inserted into the open end of the grooves 38, 38 adjacent the outer edge of the ears 34, 34 and are pushed along the grooves so that the ramped bottom surfaces compresses the plungers until the spring loaded plungers expand into the sockets 36, 36. When the plungers 32, 32 spring into the sockets 36, 36, the night vision goggle 16 and its mount assembly 28 are releasably and rotatably coupled to the mounting receptacle 35. To remove the goggle 16 from the receptacle 35, the goggle is pulled with sufficient force so that the concave wall of the sockets 36, 36 compresses the plungers 32, 32 and the plungers ride along the grooves 38, 38 until the goggle is free of the receptacle.

The outer surface of the support band 10 is formed with a pair of ears 20, 20, which are spaced apart from each other and which extend in the forward direction. Each ear 20, 20 also contains sockets 40, 40 on the surface of the ear that faces the adjacent surface of the other ear. These sockets 40, 40 are also in the form of generally spherical depressions that cooperate with spring loaded plungers 42, 42 carried on the power pack 14 to releasably couple the power pack 14 to the support band 10. As best seen in FIG. 1, the plungers 42, 42 are carried in the power pack's second compartment and extend through the side walls 26, 26 thereof. As with the previously described plungers 32, 32, the plungers 42, 42 can be balls or are otherwise formed with spherical end surfaces Each socket 40 also communicates with a groove 44. These grooves 44, 44 are tapered and ramped similar to the taper and ramp described with respect to grooves 38, 38. Thus, each groove 44 has an open end adjacent the outer edge of its associated ear 20 and this open end has a larger arc length than the end of the groove adjacent its associated socket 40; and, the bottom surface of each groove inclines inwardly from the outer edge of its associated ear to its associated socket so that the distance between the grooves decreases as the grooves approach the sockets.

The sockets 40, 40 and their associated grooves 44, 44 can be machined or molded in the ears 20, 20 or these sockets and grooves can be advantageously formed in inserts 50, 50 carried on the ears.

The power pack 14 is coupled to the support band 10 by inserting the spring loaded plungers 42, 42 into the open end of the grooves 44, 44 and pushing the power pack so that the plungers ride along the grooves and expand into the sockets 40, 40 to releasably couple the power pack to the support band 10. Removal of the power pack 14 is accomplished by pulling the power pack in the forward direction so that the plungers 42, 42 are compressed and ride out of the sockets 40, 40 and along the grooves 44, 44 until the power pack is free of the support band 10.

As noted above, the goggle 16 is relatively heavy and the power pack 14 is relatively light. As a consequence the forces acting during an ejection could release the goggle 16 from the power pack 14 before the power pack is released from the support band 10. If the goggle 16 releases from the power pack 14 before the power pack releases from the support band 10, the power pack lacks sufficient weight to assure that it will separate from the support band.

Figure 2:
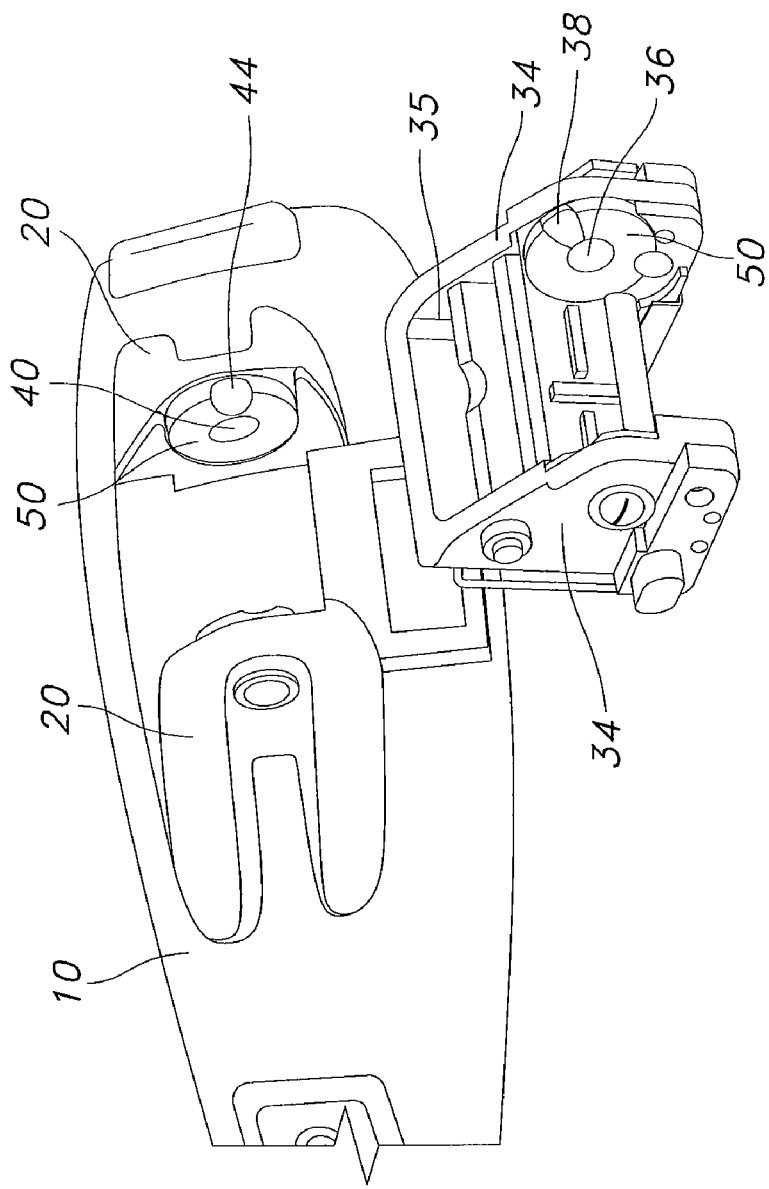
FIG. 2 is another perspective view showing the support band and part of the goggle mount juxtaposed to show the relative orientation of the grooves in each.

Referring specifically to FIG. 2, the support band 10 and the mounting assembly 28 are shown juxtaposed next to each other in a position of use. It can be seen that the grooves 44, 44 extend in the generally forward direction and that the grooves 38, 38 extend upwardly at an angle to the forward direction. The axis of the grooves 38, 38. thus forms an angle with the axis of the grooves 44, 44. In the embodiment described herein, the angle is about 45°, but other angles can be used. This angular arrangement helps to assure that both the power pack 14 and the goggle 16 are released as a single unit from the support band 10 when the pilot ejects from the aircraft. Moreover, the upward angle of the grooves 44, 44 assures that the power pack 14 and goggles 16 are ejected from the helmet in an upward and outward direction and do not impact against the aviator or fall into his/her lap.

In actual use the spring load between the plungers 42, 42 and the sockets 40, 40 is such that the power pack 14 and goggles 16 release from the support band 10 at a predetermined g-force, e.g., at least about 9 gs and preferably at about 11 gs.

While in the foregoing there has been disclosed an exemplary embodiment of the invention, it should be understood that the scope of the invention is set forth in the appended claims.

What is claimed:

1. A night vision apparatus:
said apparatus including a helmet mount, a night vision goggle intensifying low level light into a visible image and a power pack providing electric power operating the goggle;
said helmet mount including a support band having an inner surface configured to seat on the front surface of a helmet and adapted to be fixed thereto, and a first pair of spaced apart ears extending from the outer surface of the support band in a generally forward direction, each ear containing a socket on the surface facing the adjacent surface of the other ear;
said power pack including a spring loaded plunger assembly that cooperates with the sockets to releasably couple and uncouple the power pack to and from the support band; and
said power pack including a power mount assembly for coupling and uncoupling the night vision goggle to the power pack, said power mount assembly comprising a receptacle having a second pair of spaced apart ears extending in a generally forward direction, each of such second pair of ears containing a socket on their adjacent surfaces, and
a spring loaded plunger assembly carried by said night vision goggle that cooperates with said sockets on said second pair of ears to releasably couple and uncouple said night vision goggle to and from said receptacle.

2. The apparatus in accordance with claim 1 wherein the spring loaded plunger assembly uncouples from the sockets under a predetermined g-force.

3. The apparatus in accordance with claim 1 wherein said spring loaded plunger assembly includes a pair of spring loaded plungers carried by said power pack and extending laterally therefrom, each plunger having a size and shape to seat in said sockets.

4. The apparatus in accordance with claim 3 wherein each socket communicates with a groove extending radially from the socket to the outer edge of the ear.

5. The apparatus in accordance with claim 4 wherein said grooves taper from a larger dimension adjacent the outer edge of the ear to a smaller dimension adjacent the socket.

6. The apparatus in accordance with claim 4 wherein the bottom surface of the grooves form a ramp that compresses the plungers as the plungers slide from the outer edge of the ear to the socket.

7. The apparatus in accordance with claim 3 wherein said grooves taper from a larger to a smaller dimension with the larger dimension being adjacent the outer edge of the ear and the smaller dimension being adjacent the socket; and
wherein the bottom surface of the grooves form a ramp that compresses the plungers as the plungers slide from the outer edge of the ear to the socket.

8. The apparatus in accordance with claim 1 wherein each socket on said second pair of ears communicates with a groove extending radially from the socket to the outer edge of the ear.

9. The apparatus in accordance with claim 8 wherein said grooves on said support band extend in a generally forward direction and wherein the grooves on said second pair of ears extend at an angle thereto whereby the axis of the grooves on the second pair of ears intersects the axis of the grooves on the support band.

10. A support for supporting night vision apparatus on a helmet, said support comprising:
a support band having an inner surface configured to seat on the front surface of a helmet and adapted to be fixed thereto;
said support band having a front surface with a pair of spaced apart first ears extending from the front surface of said band;
the adjacent face of each first ear containing a socket;
a power pack including a spring loaded plunger assembly that cooperates with the sockets of the first ears to releasably couple and uncouple the power pack to and from the support band;
the power pack having a pair of spaced apart second ears extending in a forward direction;
each second ear containing a socket; and
the night vision apparatus including a spring loaded plunger assembly that cooperates with the sockets of the second ears to releasably couple and uncouple the night vision apparatus to and from the power pack.

11. A support in accordance with claim 10 wherein a groove extends radially from each socket to an outer edge of a respective ear, said grooves taper from a larger dimension adjacent the outer edge to a smaller dimension adjacent the socket.

12. A support in accordance with claim 11 wherein the bottom surface of each groove forms a ramp.

13. A support in accordance with claim 11 wherein said grooves taper from a larger dimension adjacent the outer edge of the respective ear to a smaller dimension adjacent the each socket and wherein the bottom surface of said grooves form each groove forms a ramp.

* * * * *